US008442522B2

(12) United States Patent
Pancorbo Marcos et al.

(10) Patent No.: US 8,442,522 B2
(45) Date of Patent: May 14, 2013

(54) DETECTION AND REPORT OF LIMITED POLICY AND CHARGING CONTROL CAPABILITIES

(75) Inventors: Maria Belen Pancorbo Marcos, Madrid (ES); Jose Javier Pastor Balbás, Madrid (ES); Susana Fernandez Alonso, Madrid (ES); David Castellanos Zamora, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/129,502

(22) PCT Filed: Nov. 12, 2009

(86) PCT No.: PCT/IB2009/007440
§ 371 (c)(1),
(2), (4) Date: Oct. 6, 2011

(87) PCT Pub. No.: WO2010/055402
PCT Pub. Date: May 20, 2010

(65) Prior Publication Data
US 2012/0021741 A1    Jan. 26, 2012

Related U.S. Application Data

(60) Provisional application No. 61/114,843, filed on Nov. 14, 2008.

(51) Int. Cl.
*H04W 4/00* (2009.01)
(52) U.S. Cl.
USPC .................. 455/432.1; 455/414.1; 455/412.2; 455/406
(58) Field of Classification Search .................. 455/403, 455/414.1, 414.2, 450, 452.1, 452.2, 451, 455/433, 435.1, 405, 406, 432.1, 434, 412.2, 455/567; 709/228, 229, 230; 370/328, 329
See application file for complete search history.

(56) References Cited

U.S. PATENT DOCUMENTS

| 7,912,477 | B2 * | 3/2011 | Tamura et al. | 455/452.2 |
| 2007/0066286 | A1 * | 3/2007 | Hurtta | 455/414.1 |
| 2007/0232301 | A1 * | 10/2007 | Kueh | 455/433 |
| 2008/0046963 | A1 * | 2/2008 | Grayson et al. | 726/1 |

(Continued)

OTHER PUBLICATIONS

3GPP-Standards, 2500 Wilson Boulevard, Suite 300, Arlington, Virginia 22201 USA, Mar. 20, 2007, XP040278231.

(Continued)

*Primary Examiner* — Jean Gelin

(57) ABSTRACT

A method of a Home Policy and Charging Rule Function (H-PCRF) in a telecommunications network having a Home Public Mobile Public Network (HPLMN) and a Visited Public Mobile Public Network (VPLMN) includes the steps of receiving signaling messages at a network interface. There is the step of detecting dynamically from a received message with a processing unit a Policy and Charging Control (PCC) scenario with regard to PCC capabilities of a VLPMN. There is the step of sending a message from the network interface to a Home Application Function (H-AF) notifying the H-AF of the detected PCC scenario so the H-AF can decide whether to progress a service negotiation with regard to a user roaming on said VPLMN or not. A Home Policy and Charging Rule Function (H-PCRF) in a telecommunications network having a Home Public Mobile Public Network (HPLMN) and a Visited Public Mobile Public Network (VPLMN). A method of a Home Application Function (H-AF) in a telecommunications network having a Home Public Mobile Public Network (HPLMN) and a Visited Public Mobile Public Network (VPLMN). A Home Policy Application Function (H-AF) in a telecommunications network having a Home Public Mobile Public Network (HPLMN) and a Visited Public Mobile Public Network (VPLMN).

20 Claims, 5 Drawing Sheets

U.S. PATENT DOCUMENTS

| | | | |
|---|---|---|---|
| 2009/0141625 A1* | 6/2009 | Ghai et al. | 370/230 |
| 2009/0182883 A1* | 7/2009 | Giaretta et al. | 709/228 |
| 2009/0228956 A1* | 9/2009 | He et al. | 726/1 |
| 2010/0027509 A1* | 2/2010 | Velev et al. | 370/331 |
| 2011/0183667 A1* | 7/2011 | Tamura et al. | 455/433 |
| 2011/0275377 A1* | 11/2011 | Wu et al. | 455/436 |
| 2011/0286384 A1* | 11/2011 | Sugimoto et al. | 370/328 |
| 2012/0226814 A1* | 9/2012 | Stucker | 709/227 |

OTHER PUBLICATIONS

"Digital cellular telecommunications system (Phase 24+); Universal Mobile Telecommunications System (UMTS) : LTE; Policy and Charging Control (PCC) over S9 reference point (3GPP TS 29.215 version 8.2.0 Release 8)" Technical Specification, European Telecommunications Standards Institute (EIS!), 650. Route des Lucioles, F-06921 Sophia-Antipolis ; France, No. V8.2 0, Jun. 1, 2009, XP014044669.

3rd Generation Partnership Project: Technical Specification Group Services and System Aspects; Policy and charging control architecture (Release 8), 3GPP TS 23.203 V8.3.1 Sep. 2008.

* cited by examiner

DETECTION AND REPORT OF LIMITED POLICY AND CHARGING CONTROL CAPABILITIES

This application claims the benefit of U.S. Provisional Application No. 61/114,843, filed Nov. 14, 2008, the disclosure of which is fully incorporated herein by reference.

TECHNICAL FIELD

The present invention is related to a Home Policy and Charging Rule Function (H-PCRF) in a telecommunications network having a Home Public Mobile Public Network (HPLMN) and a Visited Public Mobile Public Network (VPLMN) that detects dynamically a Policy and Charging Control (PCC) scenario with regard to PCC capabilities of a VLPMN. (As used herein, references to the "present invention" or "invention" relate to exemplary embodiments and not necessarily to every embodiment encompassed by the appended claims.) More specifically, the present invention is related to a Home Policy and Charging Rule Function (H-PCRF) in a telecommunications network having a Home Public Mobile Public Network (HPLMN) and a Visited Public Mobile Public Network (VPLMN) that detects dynamically a Policy and Charging Control (PCC) scenario with regard to PCC capabilities of a VLPMN and sends a message to a Home Application Function (H-AF) notifying the H-AF of the detected PCC scenario so the H-AF can decide whether to progress a service negotiation with regard to a user roaming on said VPLMN or not.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Policy and Charging Control PCC was defined in 3GPP Release 7. The PCC architecture includes the PCRF (Policy and Charging Rules Function) that provides service data flow detection and, policy and charging control towards a PCEF (Policy and Charging Enforcing Function). These functions are provided by means of the so called PCC rules. A PCC rule is a set of information enabling the detection of a service data flow and providing parameters for policy control and/or charging control. The PCRF receives service information from the H-AF (Home Application Function) as input to generate PCC rules that include the SDF (service data flow) filters and QoS requirements for the particular service requested by the AF. The PCC rules are then installed at PCEF that enforces them providing service data flow detection and policy enforcement. When the PCRF provides PCC Rules to the PCEF, the PCEF decides if the QoS requirements requested within the PCC Rule requires the establishment of a new bearer towards the RAN. Functionalities defined for PCRF and PCEF can be implemented in specialized nodes, or can be co-located with nodes performing further functions. For example, gateway nodes, such as GGSN or, more generally, gateway nodes interfacing media for user terminals, such as Packet Data Network Gateways nodes (PDN-GW), preferably implement the enforcing functions defined for a PCEF.

3GPP Rel-8 standardizes the "off-path model" that includes the BBERF (Bearer Binding and Event Reporting Function) within the PCC architecture for those cases where GTP protocol (GPRS Tunneling Protocol) is not used between the serving gateway S-GW and the PDN-GW. The BBERF provides service data flow detection, bearer binding and event report functions (it reports events to the PCRF). The BBERF allows exchanging PCC information between the access gateway A-GW (that includes a BBERF) and the PDN-GW (that includes a PCEF) using the PCRF as mediator. This PCC information is carried over GTP but cannot be transported over the mobility protocols (DSMIP, PMIP v6 and MIP v4) that have been included in the Rel-8 Evolved Packet Core Architecture.

The PCRF receives service information from the H-AF as input for to generate PCC rules. The PCRF provides PCC Rules to the PCEF and QoS Rules (subset of the PCC rules that do not include changing info) to the BBERF. The BBERF decides if the QoS requirements that the service identified by the SDF description within the QoS Rule requires the establishment of a new bearer towards the RAN.

The "off-path model" introduces the need to deploy a new reference point between the PCRF and the BBERF, named Gxx. In addition to that, the "off-path model" introduces the need to deploy a PCRF in the VPLMN and a new inter-operator reference point, named S9, to communicate PCC information between the V-PCRF and the H-PCRF.

In roaming scenarios it may happen that PCC is not deployed by either the VPLMN or the HPLMN. For those scenarios where the VPLMN does not deploy PCC (e.g. when roaming to a non-3GPP access not supporting PCC), it is not possible to provide the following PCC functions (as described in [3GPP TS 23.203 v. 8.3.1 Policy and Charging Control Architecture (Release 8)] clause Limited PCC support):

Dynamic QoS control in the VPLMN and
   Event reporting from the VPLMN to the HPLMN.
   However, PCC can still be used for the purpose of charging in the HPLMN.

A mechanism based on local static configuration both at the H-PCRF and at the OCS has been defined in [3GPP TS 23.203 v.8.3.1 Policy and Charging Control Architecture (Release 8)]. The local configuration is based on roaming agreements. The H-PCRF is aware that the UE is roaming in a PLMN that does not support either dynamic QoS Control or Event Reporting. The OCS is aware that the UE is roaming in a PLMN that does not support Event Reporting. FIG. 1 shows limited PCC deployment in home routed scenarios. VPLMN does not support PCC.

In regard to problems with existing solutions, this invention relates to the following roaming scenario:
   The UE is roaming (in a VPLMN)
   Home-Routed scenario: traffic is sent to the HPLMN
   PCC is deployed in the HPLMN but not in the VPLMN
   A protocol with no QoS information support is used in the way from the UE to the PCEF (off-path model using PMIP, MIP v4 or DSMIPv6).
   FIG. 2 shows the problem description and target scenario.

The static mechanism that is defined to allow the HPLMN to detect whether dynamic PCC is supported by the VPLMN is based on roaming agreements (i.e. PLMN-id where the UE is currently roaming) presents the following problems:
   The identifier of the PLMN where the UE is roaming is not sent to the HPLMN. The PLMN-id (MCC+MNC) where the UE is roaming is not available at the PCEF. The PLMN-id is sent to the PCEF when GTP is used but it is not sent over any of the mobility protocols (PMIP, MIP v4 or DSMIPv6). The static configuration cannot for the moment be based on VPLMN identifiers. The static configuration needs then to be based on other information such as PCEF obtaining the IP address of the A-GW; then, there must be a mapping table from IP address ranges to PLMN-id.

The configuration of the mapping table must be coordinated between the PCRF's and OCS instances in the HPLMN. This means that a centralized OAM system is required to perform the task to configure the H-PCRF's and the OCS with the correct information.

In a deployment scenario where within the same PLMN, some A-GW support S9 and some A-GWs do not supported yet, the mapping tables become much more complex. The mapping tables may have to include the full IP addresses of the A-GWs.

Additionally, there is a fundamental problem for the H-AF not covered by the static configuration mechanism defined in [3GPP TS 23.203 v.8.3.1 Policy and Charging Control Architecture (Release 8)]. Since H-AF cannot know whether the QoS Authorization provided to the H-PCRF and associated to H-AF service sessions can be enforced through the network or not. The H-AF will act as if the QoS Authorization can be successfully enforced. However, the related QoS policies cannot be traversed through the VPLMN and therefore the VPLMN cannot reserve the corresponding resources. Consequently the service delivery may suffer some degradation or it may even not be possible to be completed creating a faulty situation for both the operator and the user.

A more detailed description of the limited deployment of PCC functions in the system is now provided. If Gxx/S9 interface is not supported the following PCC functions are not available:

QoS control: It is not possible to authorize resources for a certain service session according to the service requirements.

Event Reporting: It is not possible to report any events detected at the VPLMN to the H-PCRF. As a consequence, the H-PCRF cannot subscribe to these events, make policy decisions based on that information nor to report them either to the PCEF or to the H-AF.

The lack of these PCC functions has the following consequences:

1. The H-AF will contact the H-PCRF to request Dynamic Policy and Charging Control, but only Charging Control is available.

The H-AF will not be notified about it, the service delivery will not be under operator control but it will depend on the UE capabilities to set up new bearers.

2. The H-PCRF will not be able to authorize in a proper way the session information received over Rx interface.

Since the H-PCRF does not know about the authorized GBR, therefore subscription based admission control will not be performed.

3. Wrong Charging might be applied to the service.

The OCS will not be notified about any IP-CAN session modification due to a credit reauthorization or an event trigger.

4. Wrong policies might be applied to the service.

The H-PCRF will not be notified about any IP-CAN session modification due to a credit reauthorization or an event trigger.

5. Unknown bearer-initiated capabilities and BCM at the H-PCRF.

The H-PCRF cannot know whether the network initiated procedures are supported by all the nodes in the network since this parameter is not transmitted via DSMIP or PMIP protocols.

H-PCRF cannot assign the BCM to be used for this IP-CAN session. It is not defined how the A-GW or the UE will react when the BCM is not set by the H-PCRF.

6. Incorrect attempts for dedicated bearer establishments by the network.

The H-PCRF and optionally the PCEF (chained case) are not aware of the network deployment. This results in incorrect enforcements and inappropriate policy decisions.

EXAMPLE

The problem is illustrated in FIG. 3. FIG. 3 shows limited PCC deployment concerning the home routed case. The UE attaches to a non-3GPP access (step 1). Gateway control session establishment procedure (step 2) is not executed in this case since the A-GW does not support Gxx interface. The A-GW requests an UE-IP address (step 3) to the PDN-GW so the PDN-GW/PCEF sends an Indication of IP-CAN Session Establishment to the H-PCRF requesting PCC Rules (step 4). H-PCRF creates a Gx session that is not associated with any Gxx/S9 session (since neither Gxx nor S9 interaction has been received). The PCC Rules are installed in the PDN-GW/PCEF. The PDN-GW/PCEF returns the allocated UE IP address to the A-GW (step 5). No QoS Rules provisioning procedure (step 6) is executed towards the A-GW since Gxx is not implemented. Later, the UE negotiates a service session, and then the H-AF notifies the H-PCRF that creates PCC Rules for the service session (step 7). The PCC Rules are installed over Gx to the PDN-GW/PCEF (step 8); the PCC Rules contains information for Service Data Flow detection and charging of the service data flow. The PDN-GW/PCEF does not establish a new bearer for the service even if the service session requires that the NW set up transmission resources. In this case, the H-AF is not aware that QoS control is not applied to the H-AF sessions. If the service was configured as UE-init, the terminal will try to initiate a bearer according to the session negotiation. This procedure will be out of the operator control without operator awareness and may lead to faulty situations.

SUMMARY

The present invention pertains to a method of an H-PCRF in a telecommunications network having an HPLMN and a VPLMN. The method comprises the steps of receiving signaling messages at a network interface. There is the step of detecting dynamically from a received message with a processing unit a PCC scenario with regard to PCC capabilities of a VLPMN. There is the step of sending a message from the network interface to an H-AF notifying the H-AF of the detected PCC scenario so the H-AF can decide whether to progress a service negotiation with regard to a user roaming on said VPLMN or not.

The present invention pertains to an H-PCRF in a telecommunications network having an HPLMN and a VPLMN. The H-PCRF comprises a network interface that receives and sends signaling messages. The H-PCRF comprises a processing unit which detects dynamically from a received message a PCC scenario with regard to PCC capabilities of a VLPMN. The network interface sends a message to an H-AF notifying the H-AF of the detected PCC scenario so the H-AF can decide whether to progress a service negotiation with regard to a user roaming on said VPLMN or not.

The present invention pertains to a method of an H-AF in a telecommunications network having an HPLMN and a VPLMN. The method comprises the steps of receiving a message from an H-PCRF at a network interface which notifies the H-AF of a detected PCC scenario with regard to PCC capabilities of a VLPMN. There is the step of deciding with a processing unit whether to progress a service negotiation with regard to a user roaming on said VPLMN or not based on the information received in the message from the H-PCRF.

The present invention pertains to an H-AF in a telecommunications network having an HPLMN and a VPLMN. The H-AF comprises a network interface that receives a message from an H-PCRF which notifies the H-AF of a detected PCC scenario with regard to PCC capabilities of a VLPMN. The H-AF comprises a processing unit which decides whether to progress a service negotiation with regard to a user roaming on said VPLMN or not based on the information received in the message from the H-PCRF.

BRIEF DESCRIPTION OF THE DRAWINGS

In the accompanying drawings, the preferred embodiment of the invention and preferred methods of practicing the invention are illustrated in which.

DETAILED DESCRIPTION

Figure 5:
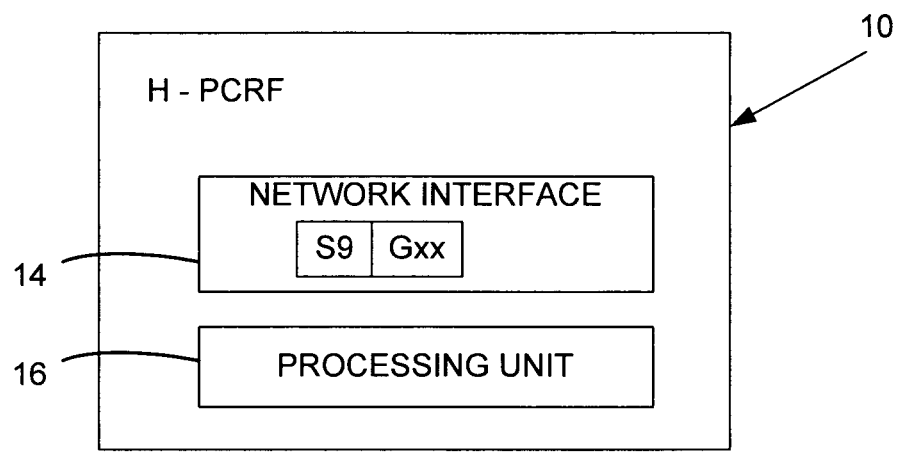
FIG. 5 is a block diagram of a Home Policy and Charging Rule Function.

Referring now to the drawings wherein like reference numerals refer to similar or identical parts throughout the several views, and more specifically to FIG. 5 thereof, there is shown an H-PCRF 10 in a telecommunications network having an HPLMN and a VPLMN. The H-PCRF 10 comprises a network interface 14 that receives and sends signaling messages. The H-PCRF 10 comprises a processing unit 16 which detects dynamically from a received message a PCC scenario with regard to PCC capabilities of a VLPMN. The network interface 14 sending a message to an H-AF 12 notifying the H-AF 12 of the detected PCC scenario so the H-AF 12 can decide whether to progress a service negotiation with regard to a user roaming on said VPLMN or not.

The processing unit 16 may detect whether in the detected PCC scenario there can be total PCC control or limited PCC control for a user roaming on said VPLMN. The processing unit 16 may detect PCC capabilities supported in a particular PCC scenario based on information about: Internet Protocol-Connectivity Access Network (IP-CAN) type and Mobility Protocol type received in an IP-CAN session establishment indication through the Gx interface, and existence of Gateway Control session signaling corresponding to said session (i.e. Gateway Control signaling that can be related to the Gx session of the concerned-roaming-user).

The network interface 14 may include at least either an S9 interface or Gxx interface which receive Gateway Control signaling, and the processing unit 16 detects that limited PCC capabilities are available in a particular PCC scenario if use of the S9 or Gxx interfaces is required for a specific IP-CAN/Mobility Protocol type combination but a corresponding Gateway Control Session signaling has not been received by the H-PCRF 10. In the content of the present description, the expression "limited PCC capabilities available (e.g. in a particular PCC scenario)" means that not full PCC capabilities are available in said scenario; for example, that dynamic QoS Control and/or session authorization and event reporting are not available. The processing unit 16 uses internally configured data establishing, for one or more combinations of specific IP-CAN/Mobility Protocol types, whether the use of S9 or Gxx interfaces is required to receive Gateway Control Session signaling by the H-PCRF 10. The network interface sends a message to the Policy and Charging Enforcement Function (PCEF) in the corresponding node, such as the PCEF in a Packet Data Network Gateway (PDN-GW), notifying the detected PCC scenario with regard to PCC capabilities of the VPLMN, so the PCEF, obtains information for notifying a Charging System (OCS) about at least part of the PCC capabilities reported by the H-PCRF with regard to a user roaming on said VPLMN.

The present invention pertains to a method of an H-PCRF 10 in a telecommunications network having an HPLMN and a VPLMN. The method comprises the steps of receiving signaling messages at a network interface 14. There is the step of detecting dynamically from a received message with a processing unit 16 a PCC scenario with regard to PCC capabilities of a VLPMN. There is the step of sending a message from the network interface 14 to an H-AF 12 notifying the H-AF 12 of the detected PCC scenario so the H-AF 12 can decide whether to progress a service negotiation with regard to a user roaming on said VPLMN or not.

The detecting step may include the step of the processing unit 16 detecting whether in the detected PCC scenario there can be total PCC control or limited PCC control for a user roaming on said VPLMN. For example, it can be determined whether event reporting and dynamic Quality of Service control are possible for a given session of a user roaming in a certain VPLMN according to the detected PCC scenario. The detecting step may include the step of detecting PCC capabilities supported in a particular PCC scenario based on information about: Internet Protocol-Connectivity Access Network (IP-CAN) type and Mobility Protocol type received in an IP-CAN session establishment indication through the Gx interface, and existence of a related Gateway Control signaling.

Gateway Control signaling may be received by the H-PCRF 10 through S9 or Gxx interfaces, and there then may be the step of the processing unit 16 detecting that limited PCC capabilities are available in a particular PCC scenario if use of the S9 or Gxx interfaces is required for a specific IP-CAN/Mobility Protocol type combination but a corresponding Gateway Control Session signaling has not been received by the H-PCRF 10. There may be the step of the processing unit 16 using internally configured data establishing, for one or more combinations of specific IP-CAN/Mobility Protocol types, whether the use of S9 or Gxx interfaces is required to receive Gateway Control Session signaling by the H-PCRF 10. There may be the step of sending a message from the network interface 14 to the Policy and Charging Enforcement Function (PCEF) (e.g. the PCEF within a Packet Data Network Gateway, PDN-GW) notifying the detected PCC scenario with regard to PCC capabilities of the VPLMN, so the PCEF obtains information for notifying a Charging System (OCS) about at least part of the PCC capabilities reported by the H-PCRF 10 with regard to a user roaming on said VPLMN.

Figure 6:
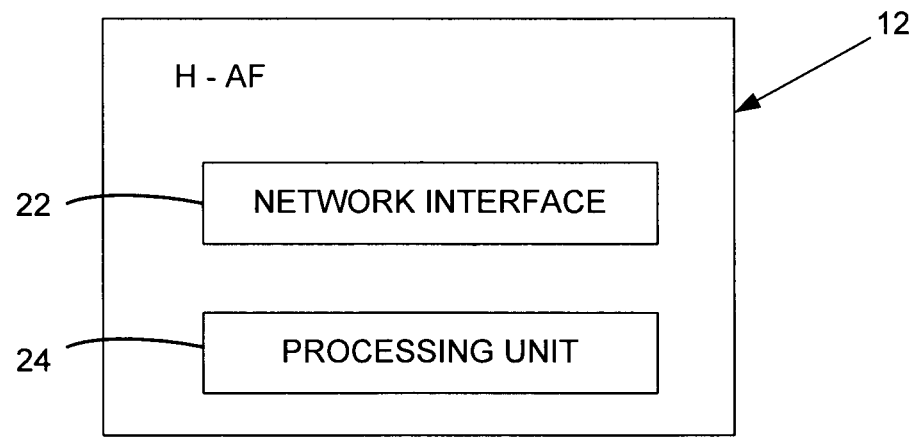
FIG. 6 is a block diagram of a Home Application Function.

Referring to FIG. 6, the present invention pertains to an H-AF 12 in a telecommunications network having an HPLMN and a VPLMN. The H-AF 12 comprises a network interface 22 that receives a message from an H-PCRF 10 which notifies the H-AF 12 of a detected PCC scenario with regard to PCC capabilities of a VLPMN. The H-AF 12 comprises a processing unit 24 which decides whether to progress a service negotiation with regard to a user roaming on said VPLMN or not based on the information received in the message from the H-PCRF 10.

The processing unit 24 may reject a service session request when, according to the information received in the message from the H-PCRF 19, Dynamic Quality of Service (QoS) is not available. The network interface 22 may send a message to the H-PCRF 10 subscribing to notification on changes of the PCC capabilities of a VPLMN with regard to the user roaming on said VPLMN. The network interface 22 may receive a message from the H-PCRF 10 notifying a detected PCC scenario as a result of said message for subscribing to notification on changes.

The present invention pertains to a method of an H-AF 12 in a telecommunications network having an HPLMN and a VPLMN. The method comprises the steps of receiving a message from an H-PCRF 10 at a network interface 22 which notifies the H-AF 12 of a detected PCC scenario with regard to PCC capabilities of a VLPMN. There is the step of deciding with a processing unit 24 whether to progress a service negotiation with regard to a user roaming on said VPLMN or not based on the information received in the message from the H-PCRF 10.

The step of deciding with the processing unit 24 whether to progress a service negotiation may include the step of the processing unit 24 rejecting a service session request when, according to the information received in the message from the H-PCRF 10, Dynamic Quality of Service (QoS) is not available. There may be the step of sending a message from the network interface 22 to the H-PCRF 10 subscribing to notification on changes of the PCC capabilities of a VPLMN with regard to the user roaming on said VPLMN. The receiving step may include the step of receiving a message from the H-PCRF 10 notifying a detected PCC scenario as a result of said message for subscribing to notification on changes.

In the operation of the invention, a flexible/dynamic detection mechanism is provided so that the H-PCRF 10 is aware of the PCC deployment scenario (i.e. whether there can be a total PCC control, or it will be limited) overcoming the deficiencies of the prior art in this area, which are based on static configuration. Based on such knowledge, the H-PCRF 10 notifies the H-AF 12, so that the H-AF 12 can decide whether to progress the service negotiation with the limited PCC control, or terminate it. The PCEF can also be notified from the H-PCRF 10 in order not to initiate specific actions towards the OCS.

The detection mechanism of the invention may include:
Means for the H-PCRF 10 to detect, without the need of static configuration, the PCC capabilities supported in a particular deployment and roaming case (e.g. whether the visited network supports dynamic QoS control) based on IP-CAN Type and Mobility Protocol information (new AVP included in Gx interface) received in a "IP-CAN session establishment" indication over Gx (e.g. step 3 on FIG. 5), and (lack of/) existence of Gateway Control signaling (S9/Gxx).

NOTE: It is believed that prior art covers H-PCRF 10 determination of limited PCC capabilities support based only on static configuration.

Based on the outcome of this detection, the invention may further include:
Means for the H-PCRF 10 to decide on the applicable PCC Rule provisioning method depending on the PCC capabilities supported (e.g. always PUSH rules to PCEF regardless of BCM selected for the IP-CAN).

Means for the H-PCRF 10 to report the UE, the "Application Function" H-AF 12, the PCEF and the OCS (via PCEF) about the limited capabilities. The reporting includes:
Dynamic QoS Control is not supported.
Event reporting on a per event basis is not available.

NOTE: It is believed that prior art covers notification to OCS (via PCEF, e.g. step 5 on FIG. 5) of limited PCC capabilities support, but based only on static configuration. However, it is believed that notifications to H-AF 12 are not currently covered by prior art, nor are additional decisions at the PCEF based on the knowledge of limited PCC capability support.

Means for the H-PCRF 10 to detect that a new deployment scenario applies (e.g. after user roams to a Visited system supporting full PCC capabilities) and then report to the UE, the H-AF 12 and the PCEF. The reporting includes:
Dynamic QoS Control is supported.
Event reporting on a per event basis is available NOTE: It is believed that prior art covers notification to OCS (via PCEF) of limited PCC capabilities support, but based only on static configuration. However, it is believed the prior-art does not cover notifications neither to PCEF, OCS (via PCEF) nor to H-AF 12 when full PCC capabilities become available again.

A procedure for the H-AF 12, OCS and the PDN-GW/PCEF to react appropriately to the current PCC functions/capabilities reported by the H-PCRF 10. For example:
The H-AF 12 may reject service session requests if Dynamic QoS Control is not available.
The PDN-GW/PCEF may configure itself not to initiate bearers based on certain preconfigured PCC Rules and may inform the OCS that Event-Reporting is or is not available so appropriate charging authorizations can be performed there.

NOTE: It is believed H-AF 12 and PCEF behavior based on the knowledge of available PCC capabilities is not currently covered by prior art.

Two main use cases regarding the present invention are illustrated:
UE attaches to a new access that doesn't support dynamic PCC.
H-PCRF 10 determines that limited PCC capabilities are provided for the IP-CAN session.
H-AF 12 and PDN-GW/PCEF are informed that limited PCC capabilities are available (dynamic QoS Control, session authorization and event reporting are not available).
UE moves from an access that does not support dynamic PCC to an access that supports dynamic PCC:
H-PCRF 10 determines that full dynamic PCC control is provided for the IP-CAN session.
AF and PDN-GW/PCEF are informed that dynamic PCC Control is available (dynamic QoS Control, session authorization and event reporting are available).
UE moves from an access that supports dynamic PCC to an access that does not support dynamic PCC:
H-PCRF 10 determines that limited PCC capabilities applies for the IP-CAN session, and then updates PCC Rules at the PCEF. PCC Rules contains only service data flow detection and charging information.
H-AF 12 and PDN-GW/PCEF are informed about the limited dynamic QoS Control, session authorization and event reporting is not available).

Figure 1:
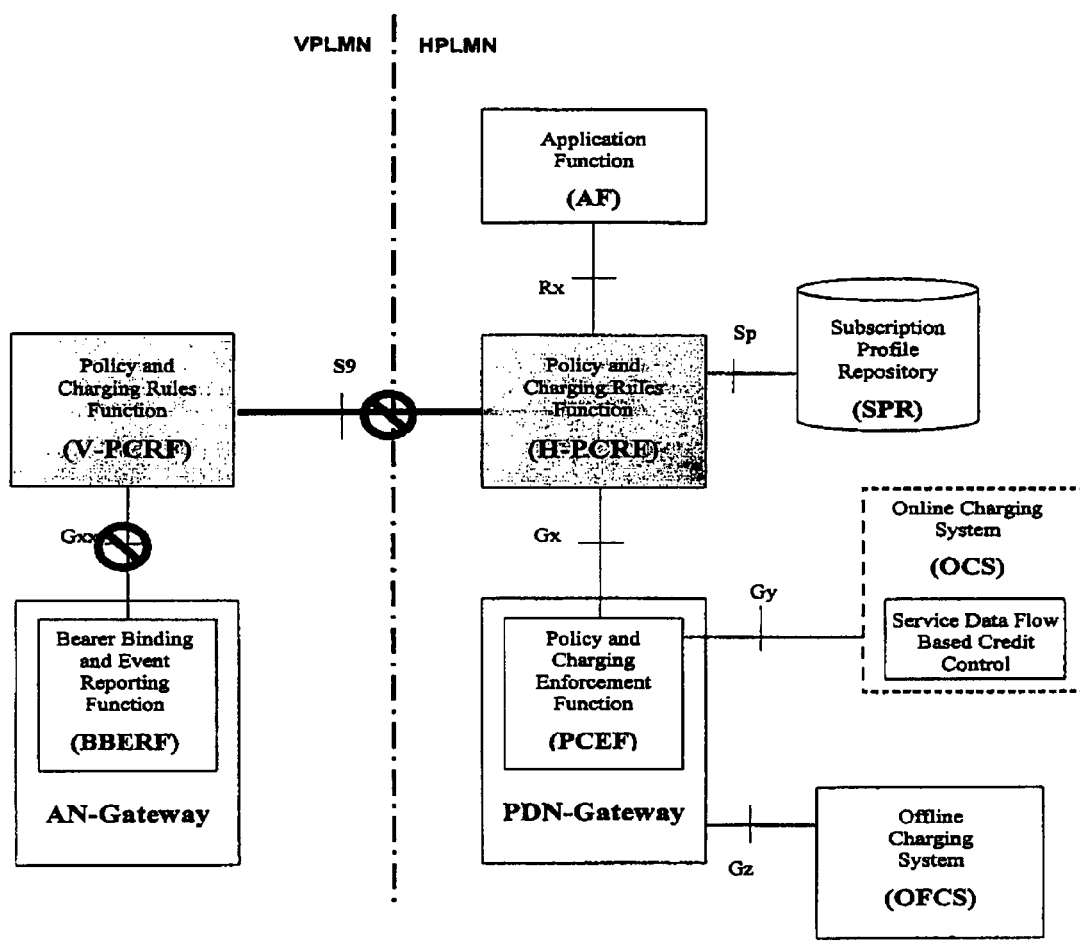
FIG. 1 shows limited PCC deployment in home routed scenarios. VPLMN does not support PCC.
Figure 2:
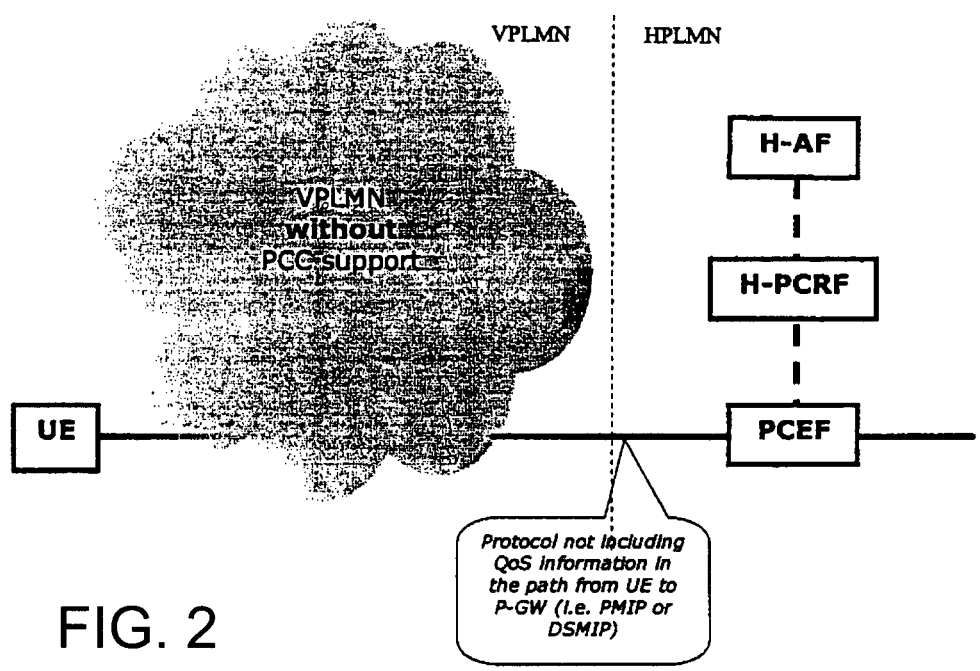
FIG. 2 shows the problem description and target scenario.
Figure 3:
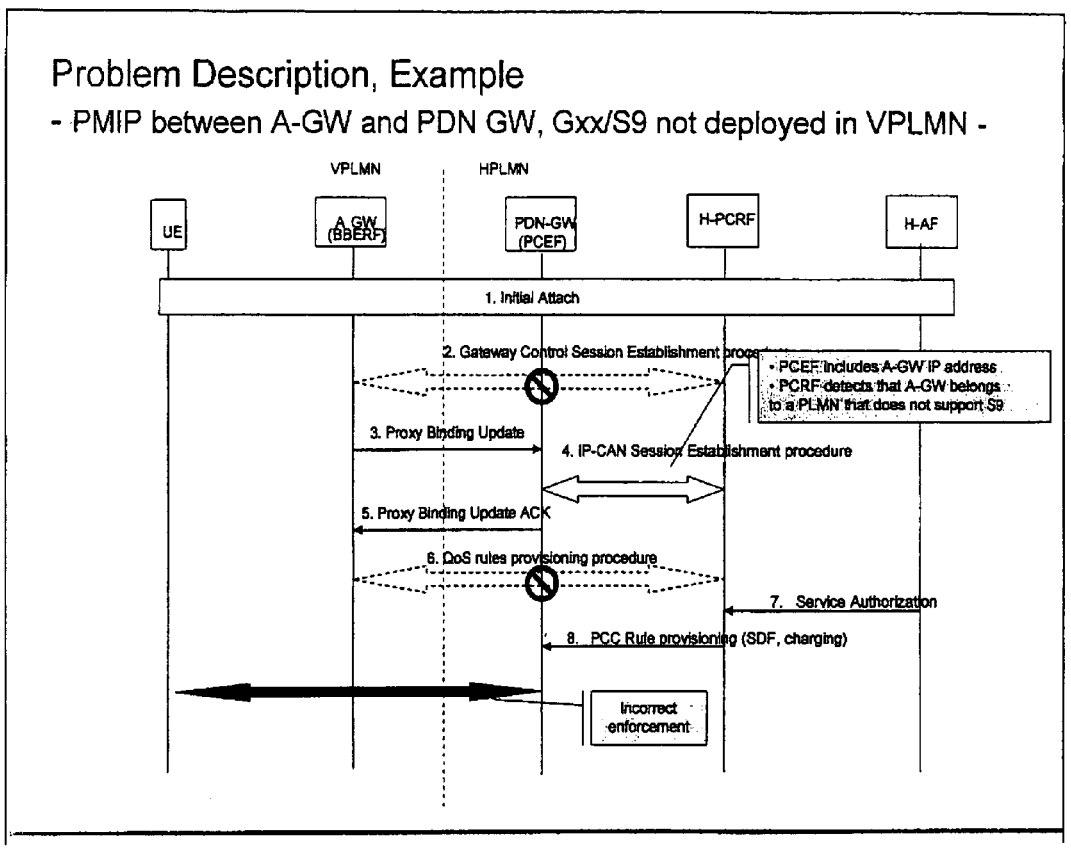
FIG. 3 shows limited PCC deployment concerning the home routed case.
Figure 4:
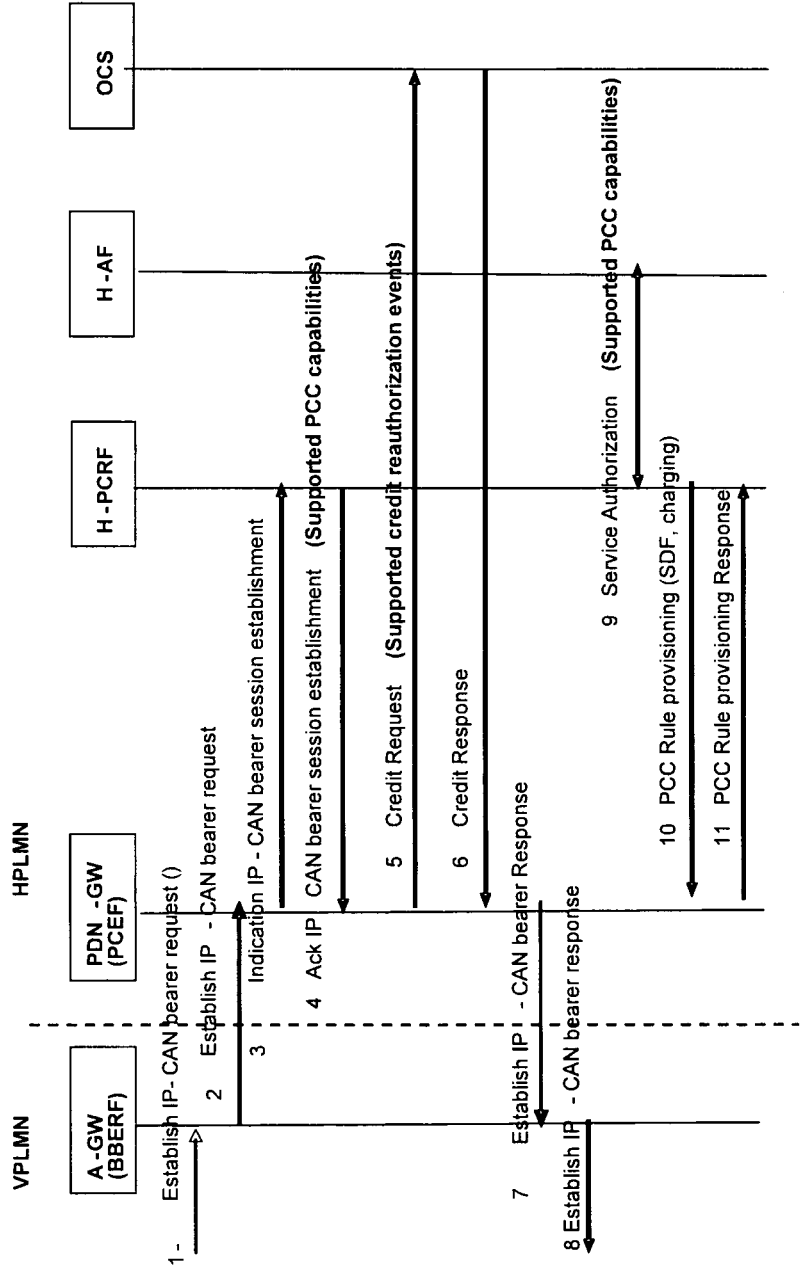
FIG. 4 shows the UE attaching to new access which does not support dynamic QoS.

The scenario where the UE attaches to a new access that doesn't support dynamic PCC is now described. FIG. 4 shows the UE attaching to new access which does not support dynamic QoS. H-PCRF 10 Detection of supported PCC capabilities at IP-CAN session establishment. When the UE attaches to the A-GW (VPLMN), the PDN-GW/PCEF (HPLMN) receives a request to establish an IP-CAN bearer (step 1 and 2 in FIG. 4). The PDN-GW/PCEF then requests PCC Rules to the H-PCRF 10 (step 3 in FIG. 4). The H-PCRF 10 detects the supported PCC capabilities at this point of the IP-CAN session establishment using the following method:

H-PCRF 10 looks into the IP-CAN type and the mobility protocol type that is indicated by the PCEF at IP-CAN session establishment (step 3 in FIG. 4) in order to determine if the use of Gxx/S9 is required or not, and thus if it is a case of roaming in a visited network with a limited PCC deployment. The following Table 1 shows when S9/Gxx is or is not required depending on the IP-CAN Type and Mobility Protocol Type used. The configuration of Table 1 can be performed by the operator.

TABLE 1

How to determine if S9/Gxx is required

| IP-CAN type | Mobility Protocol Type | S9/Gxx required |
| --- | --- | --- |
| 3GPP2 | Any | required |
| WiMAX | Any | required |
| xDSL | Any | required |
| DOCSIS | Any | required |
| WLAN | Any | Not required |
| 3GPP-GPRS | PMIP, DSMIP, MIP | required |
| 3GPP-EPS | PMIP, DSMIP, MIP | required |
| 3GPP-GPRS | GTP | not required |
| 3GPP-EPS | GTP | not required |

H-PCRF 10 finally determines that limited PCC capabilities are available in a particular roaming scenario if the use of S9/Gxx is required for the specific IP-CAN/Mobility Protocol Type combination (as described above) but the corresponding Gateway Control Session signaling over S9/Gxx has not been received.

The mobility protocol type is a new AVP that enumerates the different protocols (GTP, PMIP, DSMIP, MIP) that is supported between the A-GW and the PDN-GW.

In regard to the configuration of the H-PCRF 10 to work in a Limited PCC deployment, when the H-PCRF 10 determines that the UE is roaming in a visited network that does not support PCC (S9/Gxx required and S9/Gxx interaction was not received), the H-PCRF 10 performs the following actions:

Determine whether the IP-CAN session establishment is rejected due to the limited PCC deployment or accepted based on operator policies. If accepted, the following steps also apply.

Configure the operation mode to push PCC Rules to the PDN-GW/PCEF at reception of a request from the H-AF 12, regardless of the selected Bearer Control Mode.

Always select BCM as 'UE-only' to inform the UE.

Install PCC Rules in the PDN-GW/PCEF taking into account that no dynamic QoS control means that no pre-established dedicated bearers can be initiated from the PDN-GW/PCEF, (e.g., pre-established dedicated bearers at IP-CAN Session establishment e.g. for IMS signaling cannot be set up).

Inform the PDN-GW/PCEF about the relevant Supported PCC capabilities (only event reporting capabilities are relevant to the PDN-GW/PCEF), inform that tunnel info was not installed in the A-GW/BBERF, and subscribe to changes in the IP_CAN type, assuming that the same mobility protocol is used within the same IP-CAN type.

When reporting Supported PCC Capabilities to the PDN-GW/PCEF, the H-PCRF 10 informs the PDN-GW/PCEF about the relevant Supported PCC capabilities in the response to the IP-CAN session establishment request (step 4 in FIG. 4). See below for additional details of a potential Diameter protocol encoding of this information within Gx reference point.

Additionally, the information of the supported PCC Capabilities is relevant to the PDN-GW/PCEF in order to . . .

Configure itself not to initiate bearers based on certain preconfigured PCC Rules (e.g. not to establish dedicated pre-established bearers at IP-CAN Session establishment e.g. for IMS Signaling).

Further inform the OCS over Gy reference point about the PCC capabilities reported by the H-PCRF 10 especially in the case in the lack of certain capabilities i.e. Event-Reporting (steps 5 and 6 in FIG. 4).

See below for additional details of a potential Diameter protocol encoding of this information within Gy reference point.

In turn, this would allow the OCS to decide e.g. whether charging authorizations should be rejected in scenarios where some of these capabilities are not supported. For example, charging authorization may be rejected in scenarios where location-based charging policies exists but event reporting (e.g. to inform about roaming events to specific roaming areas) is not available.

The PDN-GW/PCEF returns a confirmation of IP-CAN session establishment that may include the allocated UE IP address (steps 7 and 8 in FIG. 4)

For reporting supported PCC capabilities to the H-AF 12, after attach and creation of the default bearer, the user may contact an Application Function to enjoy a particular service. If QoS and Charging control is required for this service, the H-AF 12 interacts with the H-PCRF 10 to provide the corresponding QoS Authorization (step 9 in FIG. 4).

According to this embodiment, the H-PCRF 10 includes in the response to the H-AF 12 an indication of the PCC functions/capabilities currently supported in the particular scenario the user is attached to. Mind that the H-PCRF 10 is made aware of such situation using the mechanisms proposed by previous embodiments.

This indication from the H-PCRF 10 would be relevant to the H-AF 12 in order to, among other, decide whether to progress or not service session with regard to a user roaming on a certain VMPLM. For example, upon reception of this indication from the H-PCRF 10, the H-AF 12 can perform one or more of the following actions:

Decide on the continuation of the initiated service session.

Configure itself to not to interact with the PCC architecture in future service session requests.

Configure itself to interact with the PCC architecture in future service session requests only for Charging Control.

Subscribe to notifications of future updates of supported PCC functions/capabilities e.g. when the user roams to an access allowing Dynamic QoS Control.

See below for additional details of a potential Diameter protocol encoding of this information within Rx reference point.

A new value for the Specific-Action AVP would be also required in order to subscribe and notify the H-AF 12 of SUPPORTED_PCC_CAPABILITIES_CHANGE events.

The new Supported-PCC-Capabilities with its applicable value should be additionally provided in this case.

The H-PCRF 10 initial and subsequent notifications and corresponding H-AF 12 actions may be taken on a per service session basis.

For the case of IMS, this embodiment has the H-PCRF 10 notifications handled at user Registration within the IMS domain instead. It is to be noticed that, in this particular embodiment (IMS), the Application Function H-AF 12 is assumed to be a "Proxy-Call Session Control Function", P-CSCF.

As currently defined in 3GPP Rx TS 29.214[3GPP TS 29.214 v.8.2.0 Policy and Charging Control over Rx interface (Release 8)], upon user Registration, the P-CSCF establishes an Rx session with the H-PCRF 10 in order to be informed of the current IP-CAN type the user is attached to and to subscribe to notification of loss of signaling connectivity and IP-CAN type changes.

In this embodiment, the H-AF 12 subscribes to notification of SUPPORTED_PCC_CAPABILITIES_CHANGE events at this time within the Rx session request and the H-PCRF 10 provides the information about the Supported-PCC-Capabilities in the current access within the response.

The P-CSCF would then configure itself according to the current support of PCC capabilities. P-CSCF decision preferably applies to subsequent IMS sessions the user may attempt while in this situation, for example . . .

Reject all IMS Session requests to/from that particular user as long as e.g. Dynamic QoS Control cannot be provided.
   Configure itself not to interact with PCC in future IMS Session requests or interact only for Charging Control purposes.

The P-CSCF is notified through the Rx session corresponding to the IMS Registration about changes in the PCC Capabilities supported. Appropriate actions may be decided by the P-CSCF at this time as well, for example . . .

Decide to terminate all ongoing sessions if e.g. Dynamic QoS Control is no longer available.
   Configure itself appropriately to interact with PCC architecture for future IMS Session requests.

The scenario where the UE moves to from an access not supporting dynamic PCC to an access that supports dynamic PCC is now described. The UE moves from an access (new IP-CAN type) not supporting dynamic PCC to an access (new IP-CAN type) that supports dynamic PCC. That means that one of the following cases happened:

That reached access has BBERF functionality within the A-GW.
   The network supports GTP protocol.
   The H-PCRF 10 realizes that the Supported PCC capabilities in the VPLMN have changed making use of the following input:
   The knowledge that a A-GW/BBERF is deployed in the new access (i.e. by means of a reception of a request for QoS Rules over S9/Gxx) or
   The knowledge that the new access supports GTP, but an explicit indication from the PDN-GW/PCEF including the mobility protocol or checking that one of the information elements transported over GTP (such as Default QoS) is received from the PDN-GW/PCEF, as outlined above.
   The current knowledge at the H-PCRF 10 that the old access to the VPLMN did not have PCC deployed.

Once that the H-PCRF 10 detects that full PCC capabilities are now available, the H-PCRF 10 could inform the PDN-GW/PCEF and H-AF 12 making use of procedures outlined above.

The scenario where the UE moves from an access supporting dynamic PCC to an access that does not support dynamic PCC is now described. The UE moves from an access supporting QoS control to an access that does not support dynamic QoS control. That means that the reached access does not have BBERF functionality within the A-GW.

The H-PCRF 10 realizes that the PCC capabilities in the VPLMN have changed making use of the following input:

The knowledge that an A-GW/BBERF is not deployed anymore in the new access (i.e. by means of lacking of corresponding S9 procedures).
   The current knowledge at the H-PCRF 10 that the old access to the VPLMN did have PCC deployed.
   The knowledge at the H-PCRF 10 that not all the protocols used in the media plane (in the path from UE to PDN-GW) include QoS information (i.e. PMIP or DSMIP is used) as described above and in Table 1 or
   The knowledge that the new access does not support GTP, but checking the list of parameters received from the PDN-GW/PCEF, as described above and using Table 1.

Once that the H-PCRF 10 detects that only limited PCC capabilities are now available, the H-PCRF 10 could inform the PDN-GW/PCEF and H-AF 12 making use of procedures as described above.

The scenario where encoding of PCC capabilities currently supported according to DIAMETER protocol is now described. In this embodiment, the information about the PCC functions/capabilities available in the current access may be encoded within Diameter protocol as a new Grouped AVP. An example of such encoding may be as follows:

Supported-PCC-Capabilities:=
   [Dynamic-QoS-Control]      ENABLED/NOT ENABLED
   [Session-Authorization]    ENABLED/NOT ENABLED
   [Event-Reporting]          ENABLED/NOT ENABLED
   [Charging-Control]         ENABLED/NOT ENABLED NOTE:
Mind that Charging Control may be disabled for some reason. The Charging-Control AVP within the Supported-PCC-Capabilities AVP can serve to indicate this condition.

This encoding can be (re)used on protocol messages exchanged over interfaces: Gx, Rx and Gy.

The invention presented herein provides the following benefits:

1. The H-PCRF 10 can be aware of the PCC deployment (PCC functions/capabilities) for roaming scenarios without the need of static configuration, and can therefore be able to . . .
   a. Configure itself appropriately (e.g. to PUSH rules regardless of BCM when Dynamic QoS is not available).
   b. Inform other network nodes (PDN-GW/PCEF and H-AF 12).
   c. Adapt policies in the proper way.

2. The H-AF 12 can be aware of the PCC capabilities currently supported and can adapt the service request according to current conditions. Due to this, a reduction in Rx interactions can be experienced while limited PCC capabilities are reported to the H-AF 12.

3. The PDN-GW/PCEF can be aware of the PCC capabilities currently supported and can inform the OCS according to current conditions.

4. The OCS can get knowledge of the PCC capabilities currently supported and adapt charging appropriately.

| Abbreviations | |
|---|---|
| A-GW | Access Gateway |
| AF | Application Function |
| AVP | Attribute/Value Peer |
| BBERF | Bearer Binding and Event Reporting Function |
| BCM | Bearer Control Mode |
| GTP | GPRS Tunneling Protocol |
| H-AF | AF in the HPLMN |
| H-PCRF | PCRF in the HPLMN |
| IMS | IP Multimedia Subsystem |
| IP-CAN | IP Connectivity Access Network |
| IP-CAN session | The term "IP-CAN session" describes the association between a UE represented by an IPv4 and/or an IPv6 address, and UE identity information, if available, and a PDN represented by a PDN ID (e.g. an APN). An IP-CAN session can incorporate one or more IP-CAN bearers. |
| OCS | Online Charging System |
| PCEF | Policy and Charging Enforcement Function |
| PCRF | Policy and Charging Rule Function |
| PDN | Packet Data Network |
| PDN-GW | Packet Data Network Gateway |
| QoS | Quality of Service |
| SDF | Service Data Flow |
| S-GW | Serving Gateway (A-GW for 3GPP access) |
| UE | User Equipment |
| V-PCRF | PCRF in the VPLMN |

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method of a Home Policy and Charging Rule Function (H-PCRF) in a telecommunications network having a Home Public Mobile Public Network (HPLMN) and a Visited Public Mobile Public Network (VPLMN), comprising the steps of:
   receiving signaling messages at a network interface;
   detecting dynamically from a received message with a processing unit a Policy and Charging Control (PCC) scenario with regard to PCC capabilities of a VPLMN; and
   sending a message from the network interface to a Home Application Function (H-AF) notifying the H-AF of the detected PCC scenario with regard to a user roaming on the VPLMN.

2. The method as described in claim 1 wherein the step of detecting includes the processing unit detecting whether in the detected FCC scenario there can be total PCC control or limited PCC control for a user roaming on the VPLMN.

3. The method as described in claim 1 wherein the step of detecting includes detecting PCC capabilities supported in a particular FCC scenario based on information about:
   Internet Protocol-Connectivity Access Network (IP-CAN) type and Mobility Protocol type received in an IP-CAN session establishment indication through the Gx interface, and
   existence of Gateway Control signaling corresponding to the IP-CAN session.

4. The method as described in claim 3, wherein Gateway Control signaling is received by the H-PCRF through S9 or Gxx interfaces, including the processing unit detecting that limited FCC capabilities are available in a particular PCC scenario if use of the S9 or Gxx interfaces is required for a specific IP-CAN/Mobility Protocol type combination but a corresponding Gateway Control Session signaling has not been received by the H-PCRF.

5. The method as described in claim 4 including the processing unit using internally configured data establishing, for one or more combinations of specific IP-CAN/Mobility Protocol types, whether the use of S9 or Gxx interfaces is required to receive Gateway Control Session signaling by the H-PCRF.

6. The method as described in claim 1 further comprising the step of sending a message from the network interface to a Policy and Charging Enforcement Function (PCEF) notifying the PCEF of the detected PCC scenario with regard to PCC capabilities of the VPLMN, so the PCEF obtains information for notifying a Charging System (OCS) about at least part of the PCC capabilities reported by the H-PCRF with regard to a user roaming on the VPLMN.

7. A Home Policy and Charging Rule Function (H-PCRF) in a telecommunications network having a Home Public Mobile Public Network (HPLMN) and a Visited Public Mobile Public Network (VPLMN), comprising:
   a network interface that receives and sends signaling messages; and
   a processing unit which detects dynamically from a received message a Policy and Charging Control (PCC) scenario with regard to PCC capabilities of a VPLMN, the network interface sending a message to a Home Application Function (H-AF) notifying the H-AF of the detected PCC scenario with regard to a user roaming on the VPLMN.

8. The H-PCRF as described in claim 7 wherein the processing unit detects whether in the detected FCC scenario there can be total PCC control or limited PCC control for a user roaming on the VPLMN.

9. The H-PCRF as described in claim 7 wherein the processing unit detects PCC capabilities supported in a particular PCC scenario based on information about:
   Internet Protocol-Connectivity Access Network (IP-CAN) type and Mobility Protocol type received in an IP-CAN session establishment indication through the Gx interface, and
   existence of Gateway Control signaling corresponding to the IP-CAN session.

10. The H-PCRF as described in claim 9, wherein the network interface includes at least either an S9 interface or Gxx interface which receive Gateway Control signaling, and the processing unit detects that limited PCC capabilities are available in a particular PCC scenario if use of the S9 or Gxx interfaces is required for a specific IP-CAN/Mobility Protocol type combination but a corresponding Gateway Control Session signaling has not been received by the H-PCRF.

11. The H-PCRF as described in claim 10 wherein the processing unit uses internally configured data establishing, for one or more combinations of specific IP-CAN/Mobility Protocol types, whether the use of S9 or Gxx interfaces is required to receive Gateway Control Session signaling by the H-PCRF.

12. The H-PCRF as described in claim 7 wherein the network interface sends a message to a Policy and Charging Enforcement Function (PCEF), notifying the PCEF of the detected PCC scenario with regard to PCC capabilities of the VPLMN, so the PCEF obtains information for notifying a Charging System (OCS) about at least part of the PCC capabilities reported by the H-PCRF with regard to a user roaming on the VPLMN.

13. A method of a Home Application Function (H-AF) in a telecommunications network having a Home Public Mobile Public Network (HPLMN) and a Visited Public Mobile Public Network (VPLMN), comprising the steps of:
receiving a message from a Home Policy and Charging Rule Function (H-PCRF) at a network interface which notifies the H-AF of a detected Policy and Charging Control (PCC) scenario with regard to PCC capabilities of a VPLMN; and
deciding with a processing unit whether to progress a service session request with regard to a user roaming on the VPLMN or not based on the information received in the message from the H-PCRF.

14. The method as described in claim 13 wherein the step of deciding with the processing unit whether to progress a service session request includes the step of the processing unit rejecting a service session request when, according to the information received in the message from the H-PCRF, Dynamic Quality of Service (QoS) is not available.

15. The method as described in claim 13 including the step of sending a message from the network interface to the H-PCRF subscribing to notification on changes of the PCC capabilities of a VPLMN with regard to the user roaming on the VPLMN.

16. The method as described in claim 15 wherein the step of receiving includes the step of receiving a message from the H-PCRF notifying the H-AF of a detected PCC scenario as a result of the message for subscribing to notification on changes.

17. A Home Application Function (H-AF) in a telecommunications network having a Home Public Mobile Public Network (HPLMN) and a Visited Public Mobile Public Network (VPLMN), comprising:
a network interface that receives a message from a Home Policy and Charging Rule Function (H-PCRF) which notifies the H-AF of a detected Policy and Charging Control (PCC) scenario with regard to PCC capabilities of a VPLMN; and
a processing unit which decides whether to progress a service session request with regard to a user roaming on the VPLMN or not based on the information received in the message from the H-PCRF.

18. The H-AF as described in claim 17 wherein the processing unit rejects a service session request when, according to the information received in the message from the H-PCRF, Dynamic Quality of Service (QoS) is not available.

19. The H-AF as described in claim 17 wherein the network interface sends a message to the H-PCRF subscribing to notification on changes of the PCC capabilities of a VPLMN with regard to the user roaming on the VPLMN.

20. The H-AF as described in claim 19 wherein the network interface receives a message from the H-PCRF notifying the H-AF of a detected PCC scenario as a result of the message for subscribing to notification on changes.

* * * * *

UNITED STATES PATENT AND TRADEMARK OFFICE
CERTIFICATE OF CORRECTION

| | | |
|---|---|---|
| PATENT NO. | : 8,442,522 B2 | |
| APPLICATION NO. | : 13/129502 | |
| DATED | : May 14, 2013 | |
| INVENTOR(S) | : Pancorbo Marcos et al. | |

It is certified that error appears in the above-identified patent and that said Letters Patent is hereby corrected as shown below:

On the Title Page, in item (57), under "ABSTRACT", in Column 2, Line 8, delete "VLPMN." and insert -- VPLMN. --, therefor.

On the Title Page, in item (57), under "ABSTRACT", in Column 2, Line 20, delete "Home Policy" and insert -- Home --, therefor.

On Title Page 2, in item (56), under "OTHER PUBLICATIONS", in Column 2, Line 3, delete "650." and insert -- 650, --, therefor.

In the Specifications:

In Column 1, Line 17, delete "VLPMN" and insert -- VPLMN --, therefor at each occurrence throughout the specification.

In Column 7, Line 57, delete "step 3 on FIG. 5)," and insert -- step 3 on FIG. 4), --, therefor.

In Column 8, Line 8, delete "step 5 on FIG. 5)" and insert -- step 5 on FIG. 4) --, therefor.

In Column 8, Line 21, delete "available" and insert -- available. --, therefor.

In Column 9, Line 8, delete "(step 1 and 2" and insert -- (steps 1 and 2 --, therefor.

In Column 10, Line 2, delete "IP_CAN" and insert -- IP-CAN --, therefor.

In Column 10, Line 12, delete "to ...." and insert -- to: --, therefor.

In Column 10, Line 34, delete "4)" and insert -- 4). --, therefor.

Signed and Sealed this
Thirteenth Day of May, 2014

Michelle K. Lee
*Deputy Director of the United States Patent and Trademark Office*

CERTIFICATE OF CORRECTION (continued)
U.S. Pat. No. 8,442,522 B2

In Column 10, Line 50, delete "VMPLM." and insert -- VPLMN. --, therefor.

In Column 11, Line 29, delete "example ...." and insert -- example: --, therefor.

In Column 11, Line 40, delete "example ...." and insert -- example: --, therefor.

In Column 12, Line 54, delete "to ...." and insert -- to: --, therefor.

In the Claims:

In Column 13, Line 53, in Claim 2, delete "FCC" and insert -- PCC --, therefor.

In Column 13, Line 57, in Claim 3, delete "FCC scenario" and insert -- PCC scenario --, therefor.

In Column 13, Line 67, in Claim 4, delete "FCC capabilities" and insert -- PCC capabilities --, therefor.

In Column 14, Line 34, in Claim 8, delete "FCC scenario" and insert -- PCC scenario --, therefor.